3,357,799
DRYING LIQUID AMMONIA
William C. Klingelhoefer, Hopewell, Va., assignor to Allied Chemical Corporation, New York, N.Y., a corporation of New York
No Drawing. Filed Dec. 6, 1962, Ser. No. 242,643
2 Claims. (Cl. 23—293)

This invention relates to ammonia and more particularly to a new and improved method for producing substantially anhydrous liquid ammonia.

Ammonia produced synthetically normally contains trace amounts of water ranging from about 50 to 300 parts of water per million parts of ammonia. For many important commercial operations this amount of water in the ammonia has no significant detrimental effect on the desired results. For many other commercial uses, however, the presence of 50 to 300 parts of water per million of ammonia causes serious operating difficulties which inevitably lead to unsatisfactory results. More specifically, in the bright annealing of special carbon steels, silicon steels, and various stainless steels, it is desirable that the ammonia used for producing the hydrogen-nitrogen mixture in the annealing process contain not more than a few parts of water per million parts of ammonia, i.e. less than about 25 parts of water per million of ammonia. Water content present in the ammonia in excess of this amount, i.e. about 25 parts per million, results in a decolorization and rejection of the metal being treated. Various methods have been proposed for reducing the amount of water present in the ammonia in an effort to produce a substantially anhydrous ammonia product which could be utilized in those cases where the presence of water, that is, about 25 parts per million or more, results in an unsatisfactory product. The usual solid adsorbents including alumina were employed in the conventional manner to treat gaseous ammonia but were found commercially unsatisfactory for the production of an ammonia containing less than 25 parts per million of water. Consequently, the art had to resort to the expensive and complicated procedure of subjecting the ammonia containing about 50 to 300 parts per million water to distillation with reflux to obtain a substantially anhydrous ammonia product containing about 5 to 25 parts water per million parts of ammonia. Unfortunately, however this procedure was time-consuming and costly because it was necessary to employ expensive equipment to supply the large amount of heat required for boiling the ammonia, and also adequate cooling for condensing the ammonia for reflux and product. Thus it will be evident that the production of anhydrous ammonia containing less than 25 parts per million water in a practical efficient manner presents a real problem.

It is an object of this invention to provide an efficient and economical process for producing an anhydrous ammonia containing less than 25 parts of water per million parts of ammonia which is useful in the bright annealing of special carbon steels, silicon steels and stainless steels. Other objects and advantages will be apparent from the following description.

In accordance with the present invention there is provided a process for producing liquid ammonia containing less than about 25 parts per million of water which process comprises passing liquid ammonia containing about 50 to 300 parts per million of water in contact with activated alumina which had been previously activated by passing an inert gas such as air or nitrogen at a temperature of 400° C. to 600° C. therethrough, maintaining the ammonia in liquid form during passage through said alumina, continuing passing said liquid ammonia through said activated alumina until the water content of the alumina is between 0.1 to 0.5 percent by weight, terminating the passage of liquid ammonia when the water content of the alumina is between 0.1 to 0.5 percent by weight, activating the alumina by passing an inert gas at a temperature of 400° to 600° C. therethrough, cooling the alumina, and continuing alternate passage of the liquid ammonia through the alumina until the water content is between 0.1 to 0.5 percent and activation of the alumina by passing an inert gas at a temperature of 400° C. to 600° C. therethrough followed by cooling, to produce an anhydrous liquid ammonia containing less than 25 parts per million of water. The resultant anhydrous ammonia product containing water in an amount of less than 25 parts per million is eminantly suitable in the bright annealing of special steels.

As previously mentioned, earlier workers have removed some moisture from ammonia by passing gaseous ammonia in contact with an adsorbent such as activated alumina, but when this operation is carried out in the manner normally used, it does not succeed in achieving economical production of ammonia having the desired high purity and low water content. The present process does succeed in producing the desired product of high purity. This is surprising because one would expect that the drying effect would be even less effective when the liquid ammonia was used than when gaseous ammonia was used. The use of liquid ammonia in contrast with use of gaseous ammonia has several advantages, namely the elimination of the necessity for vaporizing the ammonia and liquefying it after treatment and also the allowance of the use of smaller equipment in the absorber unit itself, thereby effecting important economic advantages.

The specially activated alumina employed in the practice of the present invention is in the form of granular or shaped particles usually of a size of 2 to 100 mesh, preferably 4 to 20 mesh. To obtain effective results it is important that the alumina be activated prior to passage of the liquid ammonia therethrough. Activation is accomplished by heating the alumina at a high temperature of about 400° C. to not in excess of 600° C. Heating at the conventional low temperature of 150° C. to 300° C. does not activate the alumina for this purpose and in fact the use of high temperatures in accordance with the present invention is surprising because the art considered that such high temperatures destroy the effectiveness of the alumina. Heating of the alumina for activation may be accomplished in any suitable manner; a convenient procedure is to pass a relatively dry inert gas such as air through the alumina while maintaining the temperatures of the alumina at about 400° C. to 600° C.

The specially activated alumina is disposed in an elongated drying vessel having an inlet port for the introduction of liquid ammonia at the base and an outlet at the top of the drying vessel for discharging the product. The drying vessel is constructed of a material which is non-reactive or substantially non-reactive with the charging stock under the conditions of operation, and is desirably constructed of stainless steel, although other suitable materials may be used. The drying vessel is also equipped with means for heating and cooling the vessel. For this purpose it is preferred that the drying vessel be equipped with an electrical heating element disposed within the drying vessel which may be regulated to provide the necessary temperatures. After activation of the alumina, it is cooled to a temperature of about 0° C. to 50° C. Cooling may be effected by circulating dry air through an external cooler and thence through the drying vessel containing the alumina. Although this cooling procedure is preferred because of the ease of the operation, it will be evident that other known cooling procedures may be employed. The drying vessel may be operated at atmospheric pressures however, it is preferred that super-atmospheric pressures of about 50 to 500 pounds per square inch be employed.

An important feature of the present invention is the control of the water content in the activated alumina during the passage of ammonia therethrough. I have found that the passage of ammonia through the drying vessel should be terminated when the water content of the activated alumina is between 0.1 to 0.5 percent by weight based on the weight of the alumina and preferably about 0.2 to 0.4 percent by weight. If the passage of the ammonia is continued after the water content of the alumina is substantially in excess of about 0.5 percent by weight, the alumina becomes ineffective for reducing the water content below about 25 parts per million, whereas if the flow ammonia is terminated prior to the point at which the alumina contains 0.1 percent water, the process is inefficient.

In a preferred procedure, liquid ammonia containing about 50 to 300 parts per million of water is fed to a stainless steel drying vessel containing a bed of granular or shaped particles of activated alumina which had been previously activated by heating to a temperature of about 450° C. to 550° C. while inert gas, such as nitrogen or air, was passed therethrough. After activation, the alumina in the vessel is cooled by circulating air through an external cooler and thence through the drying vessel. The liquid ammonia is then passed through the vessel at about room temperature and at a super-atmospheric pressure of about 200 pounds per square inch, in contact with the alumina, and the dry ammonia product is recovered after passage through the activated alumina. When the water content of the activated alumina has reached about 0.3 percent by weight, the flow of the liquid ammonia is discontinued and the dryer outlet is connected to a system for recovery of ammonia, such as an absorber for producing aqua ammonia. The drying vessel is then heated to a temperature sufficient to drive off vapors of the ammonia remaining in the vessel and which was adsorbed on the alumina. After the bulk of the ammonia remaining in the drying vessel is removed, an inert gas, such as air or nitrogen, is admitted to the dryer and passed through the alumina at a temperature of about 450° C. to 550° C. to reactivate the alumina. The operation of cooling the vessel and drying the ammonia is then repeated.

The following examples illustrate the present invention. In these examples temperatures are in degrees centigrade and parts are by weight unless otherwise indicated.

*Example 1*

A stainless steel tubular drying vessel was provided with asbestos insulation and a resistance winding for electrical heating. The vessel was filled with 13.5 parts of 20–42 mesh size of activated alumina. The alumina was prepared for use by heating it for about 17 hours at about 500° while nitrogen gas was passed through it. The vessel then was cooled to about 25° and was connected to a liquid ammonia source, the ammonia containing about 200 parts per million water. The liquid ammonia was passed through the vessel filled with the dried alumina at a flow rate of about 3 parts/minute and the flow of ammonia was continued for about 10 minutes, then the flow was stopped and the ammonia analyzed for water and this cycle was repeated several times. Periodically the treated ammonia was analyzed and showed water contents of 3 p.p.m., 2 p.p.m., 3 p.p.m., and 2 p.p.m. It was determined that about 216 parts of ammonia had been used for these tests with effective drying of ammonia. The alumina had dried about 180 parts of ammonia or about 15 times the weight of the alumina used. The water taken up by the alumina was calculated to be .036 part or about 0.3 wt. percent or about 0.17 pound $H_2O$ per cubic foot of alumina.

*Example 2*

The stainless steel vessel described in Example 1 was filled with 13.5 parts of 10–20 mesh size of activated alumina. The alumina in the drying vessel was activated by heating to about 560° for 75 minutes in a stream of nitrogen gas. The vessel was allowed to cool and was connected to a liquid ammonia source, the ammonia containing about 100 p.p.m. water. Periodically the ammonia leaving the vessel was analyzed and showed water contents of 7 p.p.m., 4 p.p.m., 4 p.p.m., 3 p.p.m., 2 p.p.m., 3 p.p.m., 3 p.p.m., 3 p.p.m., 3 p.p.m., 3 p.p.m., 4 p.p.m. and 10 p.p.m., respectively. These tests showed that the alumina had dried about 361 parts of ammonia to a water content of 2 to 10 p.p.m. The water taken up by the alumina at this point was calculated to be about 0.034 part or about 0.3 wt. percent based on the alumina.

Although certain preferred embodiments of the invention have been disclosed for purpose of illustration, it will be evident that various changes and modifications may be made therein without departing from the scope and spirit of the invention.

I claim:

1. A process for dehydrating liquid ammonia containing small quantities of water which comprises passing the liquid ammonia in contact with alumina which had been previously activated by passing an inert gas at a temperature of 400° C. to 600° C. therethrough, maintaining the ammonia in liquid form during passage through said alumina, continuing passing said liquid ammonia through said activated alumina until the water content of the alumina is between 0.1 to 0.5 percent by weight, terminating the passage of liquid ammonia when the water content of the alumina is between 0.1 to 0.5 percent by weight, activating the alumina by passing an inert gas at a temperature of 400° C. to 600° C. therethrough, cooling the alumina and continuing alternate passage of the liquid ammonia through the alumina and activation of the alumina and recovering the dehydrated liquid ammonia exiting the alumina, the water content of the liquid ammonia being thereby reduced to less than 25 parts of water per million parts of ammonia.

2. A process for reducing the water content of liquid ammonia to less than 25 parts of water per million parts of ammonia which comprises passing liquid ammonia containing more than 25 parts per million of water in contact with alumina which had been previously activated by passing an inert gas at a temperature of 450° C. to 550° C. therethrough, maintaining the ammonia in liquid form during passage through said alumina, continuing passing said liquid ammonia through said activated alumina until the water content of the alumina is about 0.2 to 0.4 percent by weight, terminating the passage of liquid ammonia when the water content of the alumina is about 0.2 to 0.4 percent by weight, activating the alumina by passing an inert gas at a temperature of 450° C. to 550° C. therethrough, then cooling said alumina and continuing alternate passage of the liquid ammonia through the alumina and activation of the alumina and recovering the anhydrous liquid ammonia exiting the alumina.

References Cited

UNITED STATES PATENTS

| | | | |
|---|---|---|---|
| 950,491 | 3/1910 | Nenzel | 62—474 |
| 1,809,833 | 6/1931 | Davenport | 62—474 XR |
| 2,199,258 | 4/1940 | Gray | 62—474 XR |
| 2,356,890 | 8/1944 | Schulze | 210—32 XR |
| 2,518,409 | 8/1950 | Williamson | 210—32 XR |
| 2,560,931 | 7/1951 | Chapman | 210—41 |
| 2,865,864 | 8/1955 | Eastman | 23—199 X |
| 3,080,433 | 3/1963 | Hengstebeck | 210—32 XR |

OTHER REFERENCES

Uses and Applications of Chemicals and Related Materials, Gregory Reinhold Publishing Corp., New York, 1939, pp. 26 to 27, 136 to 138, and 140 to 142.

Alumina Properties, Newsome et al., Technical Paper No. 10, 2nd revision, Aluminum Co. of Awer, Pittsburgh, 1960, pp. 52 to 57.

NORMAN YUDKOFF, *Primary Examiner.*

S. J. EMERY, *Assistant Examiner.*

UNITED STATES PATENT OFFICE
CERTIFICATE OF CORRECTION

Patent No. 3,357,799                          December 12, 1967

William C. Klingelhoefer

It is hereby certified that error appears in the above numbered patent requiring correction and that the said Letters Patent should read as corrected below.

Column 4, line 41, for "450° C." read -- 400° C. --.

Signed and sealed this 6th day of May 1969.

(SEAL)
Attest:

Edward M. Fletcher, Jr.
Attesting Officer

Commissioner of Patents